(12) United States Patent
Levesque et al.

(10) Patent No.: US 8,972,561 B1
(45) Date of Patent: Mar. 3, 2015

(54) METHODS AND APPARATUS FOR OBTAINING NETWORK INFORMATION USING FILE TRANSFER

(75) Inventors: Gilbert Levesque, Palo Alto, CA (US); Debashis Dey, Dublin, CA (US); Prakash Giri, Sunnyvale, CA (US); Malyadri Jaladanki, San Jose, CA (US); Yi Wang, Cupertino, CA (US)

(73) Assignee: Tellabs Operations, Inc., Naperville, IL (US)

( * ) Notice: Subject to any disclaimer, the term of this patent is extended or adjusted under 35 U.S.C. 154(b) by 1204 days.

(21) Appl. No.: 12/465,073

(22) Filed: May 13, 2009

(51) Int. Cl.
 G06F 15/173 (2006.01)
 H04L 12/24 (2006.01)
(52) U.S. Cl.
 CPC ................. H04L 41/0213 (2013.01)
 USPC ........................................................ 709/224
(58) Field of Classification Search
 CPC ................................................ H04L 41/0213
 USPC ................... 709/222, 223, 224, 246
 See application file for complete search history.

(56) References Cited

U.S. PATENT DOCUMENTS

| | | | | |
|---|---|---|---|---|
| 5,592,620 | A * | 1/1997 | Chen et al. | 709/223 |
| 6,341,127 | B1 * | 1/2002 | Katsube et al. | 370/352 |
| 2002/0161883 | A1 * | 10/2002 | Matheny et al. | 709/224 |
| 2002/0161885 | A1 * | 10/2002 | Childers et al. | 709/224 |
| 2003/0012182 | A1 * | 1/2003 | Sato | 370/352 |
| 2003/0033282 | A1 * | 2/2003 | Mokuya et al. | 707/1 |
| 2003/0154269 | A1 * | 8/2003 | Nyanchama et al. | 709/223 |
| 2003/0167319 | A1 * | 9/2003 | Venkatesulu et al. | 709/223 |
| 2003/0208480 | A1 * | 11/2003 | Faulkner et al. | 707/3 |
| 2005/0050225 | A1 * | 3/2005 | Tatman | 709/244 |
| 2005/0273593 | A1 * | 12/2005 | Seminaro et al. | 713/151 |
| 2005/0289197 | A1 * | 12/2005 | Kan et al. | 707/204 |
| 2006/0092861 | A1 * | 5/2006 | Corday et al. | 370/256 |
| 2009/0067331 | A1 * | 3/2009 | Watsen et al. | 370/235 |
| 2010/0085971 | A1 * | 4/2010 | Schunemann | 370/392 |

* cited by examiner

*Primary Examiner* — Bryan Lee
(74) *Attorney, Agent, or Firm* — James M. Wu; JW Law Group

(57) ABSTRACT

An apparatus and method for transferring information in bulk between network devices employing File Transfer Protocol ("FTP") are disclosed. During a network discovery process, an Element Management System ("EMS") initiates a file generation command formatted with Simple Network Management Protocol ("SNMP") to one or more network element ("NE"). After obtaining configuration information from one or more network devices, an NE, in one embodiment, establishes a file containing the configuration information and subsequently stores the file in a storage location. The file formatted in SNMP format is forwarded to EMS suing FTP/SFTP (secure file transfer protocol)/TFTP (trivial file transport protocol).

17 Claims, 5 Drawing Sheets

METHODS AND APPARATUS FOR OBTAINING NETWORK INFORMATION USING FILE TRANSFER

FIELD

The exemplary embodiment(s) of the present invention relates to network systems. More specifically, the exemplary embodiment(s) of the present invention relates to information transfer between network elements ("NE") and element management systems ("EMS").

BACKGROUND

A high-speed network environment typically includes network devices such as routers and switches used for facilitating delivery of information packets and/or data traffic from source devices to destination devices via one or more communication networks. Information pertaining to the transfer of data packet(s) and/or frame(s) through the network(s) is usually embedded within the packet and/or frame itself. Each packet, for instance, traveling through multiple nodes via one or more communications networks such as Internet and/or Ethernet can typically be handled independently from other packets in a packet stream or traffic. Each node which may include routing, switching, and/or bridging engines processes incoming packets or frames, and determines where the packet(s) or frame(s) should be forwarded.

In order to establish a high-speed computing network, element management system ("EMS") of the network is typically required to identify and/or initialize each and every attached network element ("NE") via a discovery process. When an EMS discovers one or more NEs, a large amount of data relating to discovery process including various circuit and node information need to be transferred from the NE to the EMS. For example, to obtain circuit data, EMS typically has to send large number of SNMP bulk requests, and subsequently, receives large number of independent responses back from NEs.

A problem associated with the conventional network discovery is that a typical discovery process takes resources and consumes time. Data transfer between EMS and NEs is typically slow partially due to the limitation and overhead of network protocol used for handling the data exchange.

SUMMARY

An apparatus and method for transferring bulk information between network devices using File Transfer Protocol ("FTP") are disclosed. During a network discovery process, an Element Management System ("EMS") initiates a file generation command formatted in a management network protocol such as Simple Network Management Protocol ("SNMP") to one or more network element ("NE"). After obtaining configuration information from one or more NEs, an NE, in one embodiment, establishes a file containing the configuration information and subsequently stores the file in a storage location. The EMS can then retrieve the file formatted via FTP or the remote file system.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
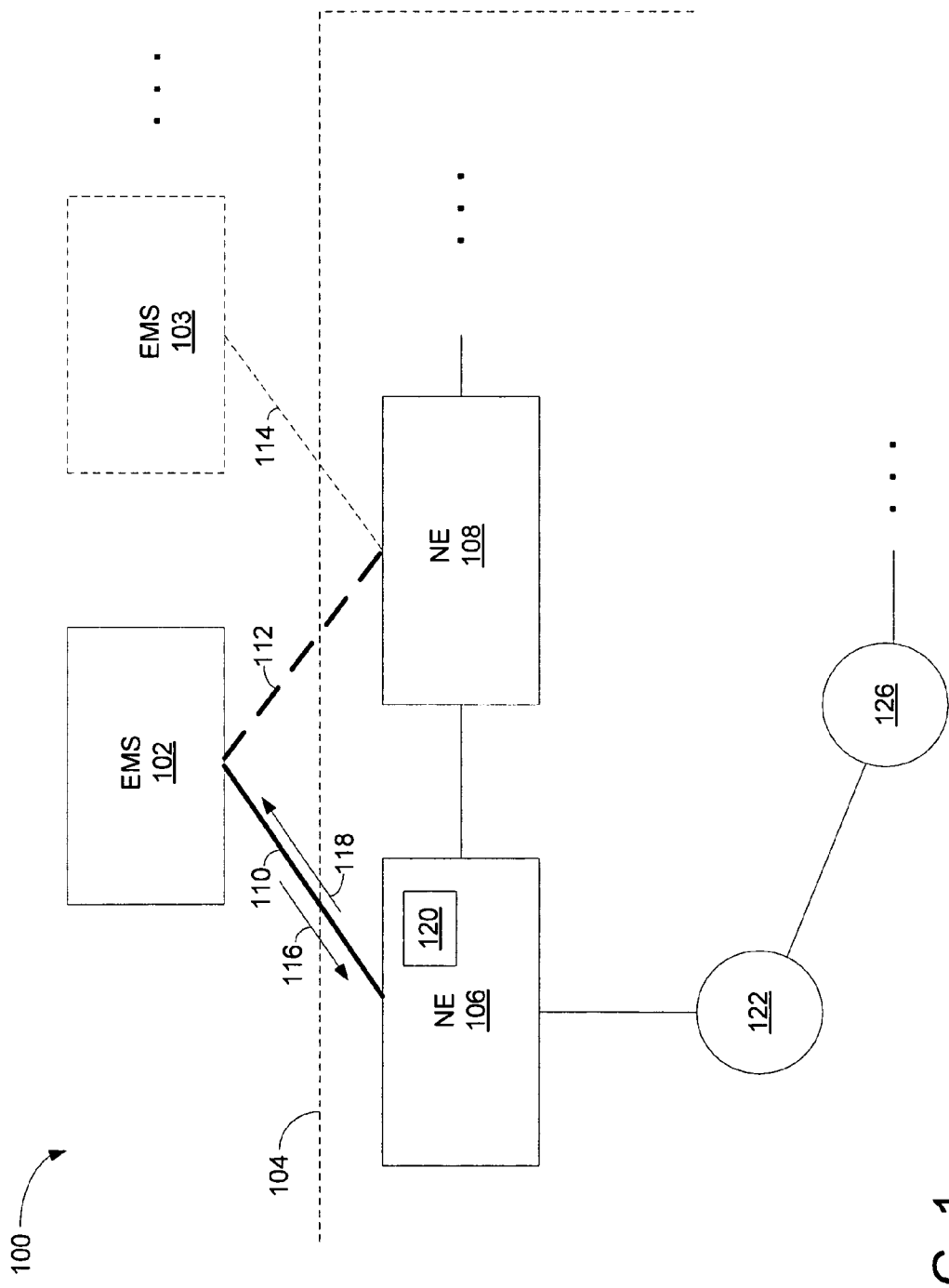
FIG. 1 is a block diagram illustrating a network configuration having EMSs and NEs in accordance with one embodiment of the present invention.

Exemplary embodiment(s) of the present invention is described herein in the context of a method, device, and apparatus of transferring network information in bulk files between network elements and EMS.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by those of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items A network configuration discloses a file transfer mechanism capable of improving efficiency in data transfer between multiple network devices. For example, during a network discovery process, Element Management System ("EMS") initiates a command for file generation to an NE. Upon obtaining discovery information such as network circuits, the NE builds a file containing the discovery information and subsequently, stores the file in an NE storage. Once the file is built, EMS can retrieve it. It should be noted that the discovery of network equipment using bulk data transfer can speed up discovery process or overall initialization process.

It should be noted that the term an NE can also be referred to as a "network element," "network equipment," "network device," "router," "switch," "bridge," "node," and the like. In addition, the term "EMS" can also be referenced to as "network management system," "element management system," "network management station," "network management console," "network control system," "network manager," et cetera.

FIG. 1 is a block diagram 100 illustrating a network configuration having EMSs and NEs in accordance with one embodiment of the present invention. Diagram 100 includes EMSs 102-103 and a network environment 104 wherein network environment 104 further includes NEs 106-108, and nodes 122-126. A node can be an NE wherein a node is an active electronic device capable of sending, receiving, or forwarding information over a communications channel. Connections 110-114 are employed to couple EMSs 102-103 with NEs 106-108. It should be noted that the underlying concept of the exemplary embodiment(s) of the present invention would not change if one or more blocks (or elements or connections) were added to or removed from diagram 100.

NEs 106-108, also known as managed devices, are hardware devices which may include routers, connections, switches, bridges, computers, terminal servers, and/or a combination of routers, connections, switches, bridges, computers, and/or terminal servers connected in network environment 104. While each NE may be connected to its neighboring NE(s), the NE may also be coupled with at least one EMS. For example, NE 108 is coupled to both EMSs 102-103 via connection 112-114 and is managed by both EMSs. NE can be considered as a facility or equipment used to facilitate provisioning of telecommunications services.

EMS 102, also known as a network managing station ("NMS"), is a computer, workstation, a server, and/or a cluster of computers capable of executing various network management applications. Various NEs and nodes are constantly being managed and monitored by an EMS(s) in a managed network environment. In each managed environment, at least one EMS should be present. Depending on the applications, multiple EMSs may be used to manage and/or monitor one or more NEs in a network. A network can either be a circuit-based network or a packet-based network.

EMSs are coupled with NEs via connection 110-114 wherein connection 110-114 can be wires, cables, coax connections, wireless connections, network connections, and the like. In one embodiment, EMS 102 is capable of transmitting data 116 to NE 106 using a first network protocol while EMS 102 receives data 118 from NE 106 with a second network protocol. For example, the first network protocol may be SNMP while the second network protocol is FTP. It should be noted that depending on the application, different types of network protocols may be used in place of SNMP and FTP.

SNMP is a network managing and surveillance protocol used in network management systems for monitoring NEs and/or network devices attached to the network environment. SNMP, for example, includes an application layer protocol which is able to process management data to control various managed systems or NEs. EMS, which is a network managing system, employs SNMP to manage a number of attached NEs or managed systems. Each attached NE or managed system is configured to report status and/or information to and from at least one managing system or EMS.

FTP, on the other hand, is capable of transferring bulk data or a file containing large amount of information from one network device to another network device or computer through a network of connections. For example, FTP is capable of exchanging and manipulating files over a transmission control protocol ("TCP") computer network. A feature of FTP is that an FTP client can manipulate files at a connected FTP server over a network. In one embodiment, trivial file transport protocol ("TFTP") is used in place of FTP. TFTP is a type of file transfer protocol having similar functionalities as FTP. In another embodiment, secure file transfer protocol ("SFTP") can be used in place of FTP for transferring bulk data from NEs to EMS. SFTP provides file transfer over a reliable and/or secured data stream.

An NE can be configured to couple with other NEs, network devices, terminals, and nodes. For example, NE 106 is coupled to NE 108 and nodes 122-126. Node, in one example, can include an NE, a router, a switch, and/or a combination of NEs, routers, and switches. The collection of NEs forms a network. For a connection oriented network, a connection, a circuit, or a channel is established between nodes and/or terminals to facilitate network communication. It should be noted that a connection circuit or a channel is setup to carry information between end units of a network. During a network discovery process, every NE with its respective data as well as network connections needs to be discovered and/or initialized by EMS or EMSs. As indicated before, it takes time and resources for each EMS to complete a network configure and/or a network discovery process. In another example, an NE discovery may be required when a primary controller switches over to a backup controller or vice verse.

To improve an automatic network discovery, EMS 102, in one embodiment, issues a SNMP command for file generation 116 to NE 106 via connection 110. NE 106 subsequently obtains discovery information from nodes 122-126. Upon receipt of discovery information, NE 106 creates or generates a file containing discovery information and the file is stored in a storage location 120. When the file is ready to be transferred, NE 106 sends the file 118 to EMS 102 via connection 110 using FTP. In one embodiment, storage location 120 is managed and controlled by EMS 102 although it is physically located in NE 106. It should be noted that storage location 120 can be located outside of NE 106.

An advantage of using an FTP file to transfer at least a portion of management information bases ("MIB") is to speed up an automatic discovery process. MIB, in one aspect, is used to generate files that contain current circuit related information and/or other relevant discovery information. The generated bulk data are subsequently retrieved via SFTP/

TFTP. Another advantage of using a bulk data transferring is that it reduces SNMP message overhead (i.e., busy SNMP traffic) in a network system.

To take additional advantage of bulk data transfer, EMS can send multiple SNMP set-requests to NE to trigger the file creation in a compressed format. NE, for example, generates a file which contains the bulk circuit data in zipped ASCII format. A trap will be sent out after the file has been generated and EMS is responsible to retrieve the file via SFTP/TFTP. In addition to compress the FTP file in a zipped ASCII format, a binary format file generation can be optionally used to compress the file. Depending on the applications, file compression in binary format can be a more efficient compression mechanism for data transfer. Note that the file compressed in binary format should have fields in similar order as the ASCII format.

Figure 2:
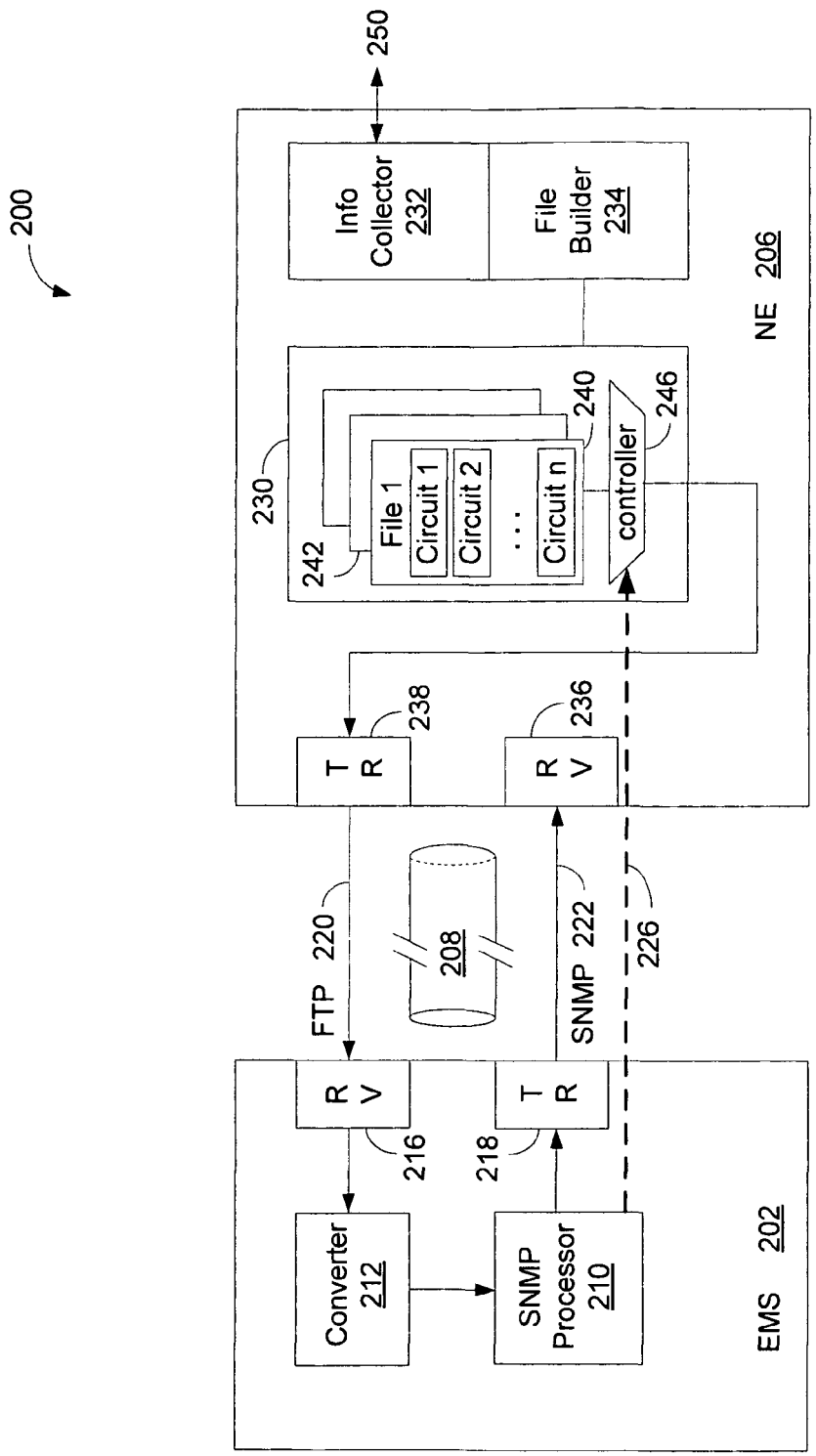
FIG. 2 is a logic block diagram illustrating a process of information transfer between an EMS and an NE during a network discovery process in accordance with one embodiment of the present invention.

FIG. 2 is a logic block diagram 200 illustrating a process of information transfer between an EMS and an NE during a network discovery process in accordance with one embodiment of the present invention. Diagram 200 includes an EMS 202, an NE 206, and a connection 208. Connection 208 can be a wired and/or wireless connection between EMS 202 and NE 206. Connection 208 can be a point to point or through a network. In one embodiment, connection 208 is capable of transferring data using SNMP 222 and/or FTP 220. It should be noted that the underlying concept of the exemplary embodiment(s) of the present invention would not change if one or more blocks (or elements or connections) were added to or removed from diagram 200.

EMS 202, in one embodiment, includes a SNMP processor 210, a converter 212, a receiver 216, and a transmitter 218. Receiver 216 and transmitter 218, in one example, can be configured in the same component. SNMP processor 210 executes or processes information in SNMP and is also capable of issuing SNMP commands to NE 206 through transmitter 218 via connection 208. Upon receipt of an FTP file by receiver 216, convert 212, in one embodiment, converts information in the FTP file from FTP to SNMP before the information is forwarded to SNMP processor 210 for processing.

NE 206, in one embodiment, includes a storage location 230, information collector 232, a file builder 234, a receiver 236, and a transmitter 238. While information collector 232 collects the connection information from other network nodes and/or devices via connection 250, file builder 234 creates a file in FTP format to save NE and connection information in the file. The file is subsequently stored in storage location 230 before it is being pushed to EMS 202. Receiver 236 is responsible to receive SNMP data 222 from transmitter 218 via connection 208, while transmitter 238 is capable of transferring FTP file 220 to EMS 202 via connection 208.

Storage location 230 further includes a storage controller 246 and multiple memories 240-242 wherein each memory is configured as a file system to store files. Each file is formatted in the management protocol syntax used by the EMS (e.g. SNMP) containing discovery information including circuit 1, circuit 2, and so on. Storage controller 246, in one embodiment, is configured to receive controlling signals from EMS 202 via connection 226. For example, when the file is built, SNMP processor 210 issues a pull SNMP command to controller 246. Upon receipt of the pull SNMP command, controller 246 releases the file to EMS 202 through transmitter 238 via connection 208 using FTP. After receipt of the file, EMS 202 issues a SNMP command for deletion to controller 246 via connection 226. The file is subsequently deleted from storage location 230 as soon as the SNMP command for deletion is received and processed.

During a discovery process, transferring in bulk can speed up discovery process and also reduce network congestion. For example, the file transfer of a portion of the MIB at a given time is more efficient than issuing a large number of SNMP data requests to obtain the same data. To retrieve circuit data, EMS 202, in one operation, sends an SNMP request 222 which triggers the creation of a file. NE 206 subsequently generates the file in SNMP format which contains the wanted circuit information in memory 240. EMS 202 then retrieves the file from NE 206 via SFTP/TFTP 220.

In one embodiment, file builder 234 is capable of zipping the file in ASCII format for the file compression. In one example, the ASCII format can be organized as a Varbind having multiple fields including object ID ("OID") field. It should be noted that the Varbind section of a response protocol data unit ("PDU") is similar to SNMP variable bindings wherein each section includes an OID, index, type, length and a fully tagged value. Alternatively, instead of ASCII file, a binary file can be used for file compression. Using file compression mechanism to compress large amount of data before file transfer can speed up discovery process and/or network reconfiguration upon occurrence of a switch-over.

Alternatively, management systems or EMSs are capable of sending configuration updates or controlling requests to NEs and/or other network devices through an operational protocol to actively manage the system. Reconfigurations and/or control operations, for example, are initiated when changes in the network infrastructure has occurred. Note that information accessible via SNMP may be organized in hierarchies, which are described by MIB. It should be noted that SNMP is part of network management architecture. MIB stores a list of managed objects residing in information storage.

In one example, EMS is responsible for managing deleting the generated file through a separate set of requests (or commands). An NE allocates a file with a maximum file size or capacity that a system allows. A read-write value, for example, can be used to indicate that a file has reached the maximum capacity which is allocated. If the size of a generated file exceeds the maximum size, NE stops file generation and issues an error message (e.g. an SNMP trap). EMS is required to delete or remove any unwanted or old file(s) in order to restore future file generation. SNMP commands "auto-push/auto-delete" and "pull" are the two (2) methods for EMS to retrieve the file from the NE. For a pull command, EMS pulls the file via FTP after the file generation is completed. Alternatively, an auto-push/auto-delete command, upon sending the file from the NE storage location, the file is deleted. As such, messages (or traps) for file generation completed and file transfer completed may be sent out. In another embodiment, a user can query a status for a specific file generation via SNMP and subsequently receive a file generation status report (or message) including approximate percentage completion of the file generation.

An advantage of using FTP file for transferring bulk data is to transmit large amount of data more efficiently between network devices.

Figure 3:
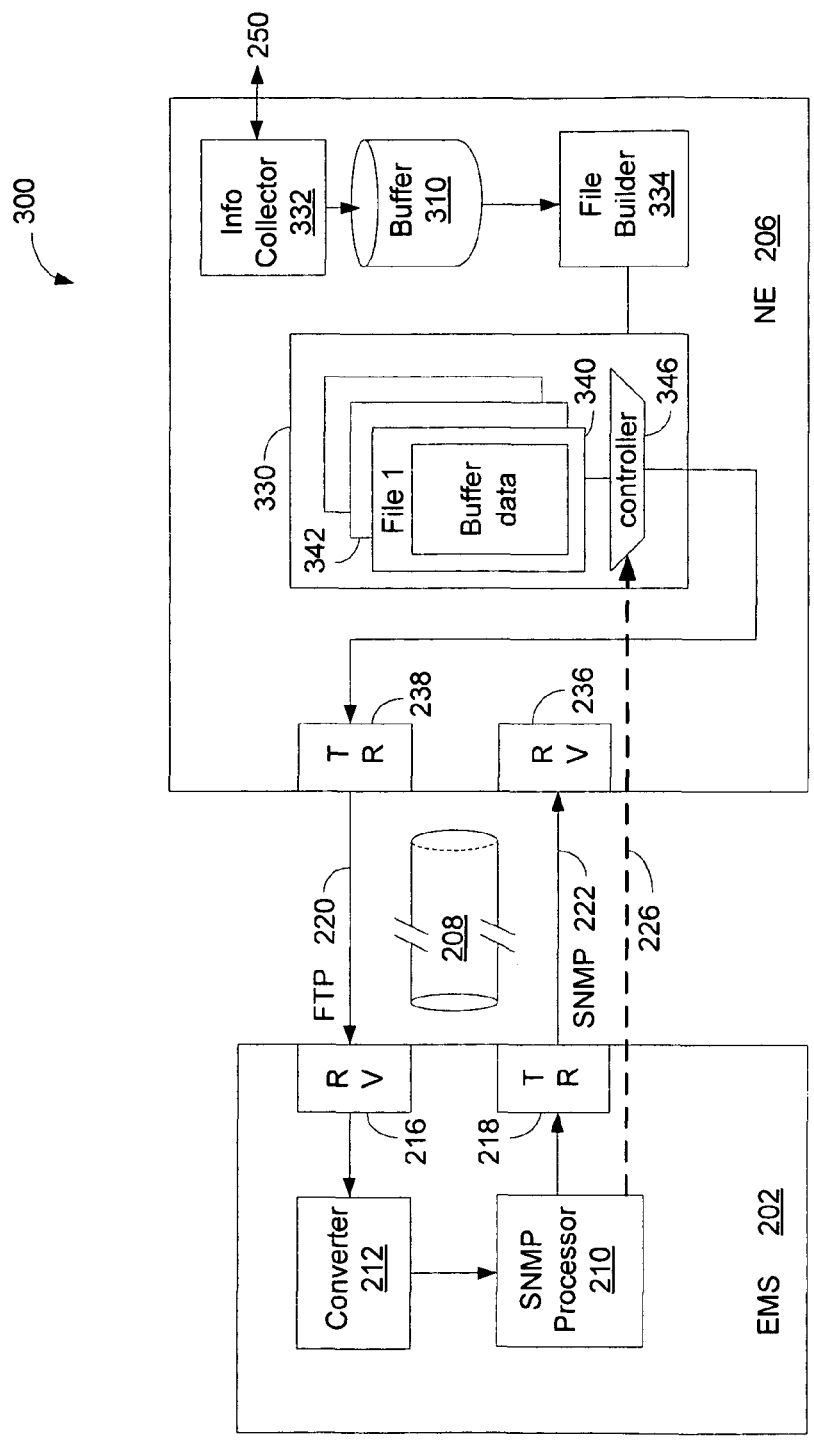
FIG. 3 is a logic block diagram illustrating a process of information transfer between an EMS and an NE during a process of switch-over in accordance with one embodiment of the present invention.

FIG. 3 is a logic block diagram 300 illustrating a process of information transfer between an EMS and an NE during a switch-over in accordance with one embodiment of the present invention. Diagram 300, similar to diagram 200 illustrated in FIG. 2, includes an EMS 202, an NE 306, and a connection 208. Connection 208, as discussed in FIG. 2, can be a wired and/or wireless connection between EMS 202 and NE 206 wherein the connection can be point to point or through a network. In one embodiment, connection 208 is capable of transferring data using SNMP 222 and/or FTP 220.

It should be noted that the underlying concept of the exemplary embodiment(s) of the present invention would not change if one or more blocks (or elements or connections) were added to or removed from diagram 300.

NE 206, in one embodiment, is a backup controller 346 including a storage location 330, information collector 332, a buffer 310, a file builder 234, a receiver 236, and a transmitter 238. While information collector 332 collects switch-over information such as routing packets between network nodes and/or devices via connection 250, the routing information is stored in buffer 310 during a switch-over scenario. During a period of a switch-over, when the primary controller 246 (see FIG. 2), for instance, stops processing the incoming packets and the backup controller 346 is in the process of taking over the routing responsibility, newly arrived incoming packets which could be large amount of data are temporarily stored in buffer 310. File builder 334 creates a file and encapsulates the stored incoming packets in the file. The file is subsequently stored in storage location 330 until the file reaches its capacity. Once the file building is completed, it is pushed to EMS 202. Receiver 236 is responsible to receive SNMP data 222 from transmitter 218 and transmitter 238 is capable of transferring the file via FTP 220 to EMS 202 via connection 208.

Storage location 330 further includes a storage controller 346 and multiple memories 340-342 wherein each memory is configured as a file system to store files up to the maximum storage capacity allowed. Each file contains buffered data, wherein storage location 330 is capable of storing multiple files with multiple buffered data. Storage controller 346, in one embodiment, is configured to receive controlling signals from EMS 202 via connection 226. For example, after the file is built, SNMP processor 210 issues a pull SNMP command. Upon receipt of the pull SNMP command, controller 346 releases the file to EMS 202 via transmitter 238. After receipt of the file, EMS 202 can issue a SNMP command of deletion to controller 346 via connection 226, the file is subsequently deleted from storage location 330.

During a switch-over process, employing in bulk data transfer instead of sending a large number of SNMP circuit data requests speeds up the switch-over process as well as reduces network congestion. To retrieve packet data, EMS 202, in one operation, sends an SNMP request 222 which triggers a file creation. Backup controller 346 subsequently generates a file which contains the incoming information in memory 340. EMS 202 then retrieves the file from NE 306 using SFTP/TFTP 220.

After a switch-over process, files containing bulk data is deleted from storage location 330. Note that EMS can recreate these files if needed.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 4:
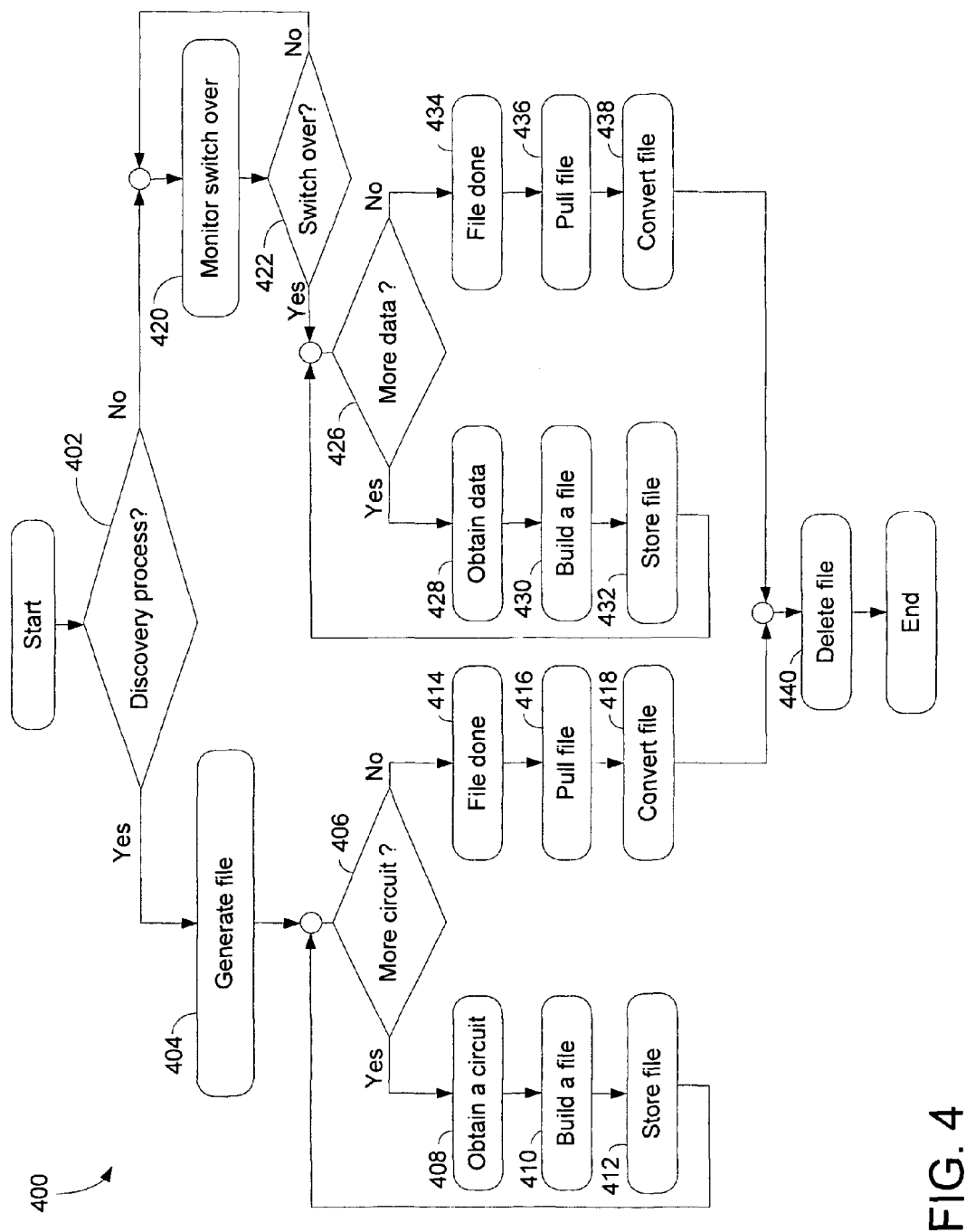
FIG. 4 is a flowchart illustrating a process of establishing a file for a network discovery process in accordance with one embodiment of the present invention.

FIG. 4 is a flowchart 400 illustrating a process of establishing a file for a network discovery process in accordance with one embodiment of the present invention. At block 402, a process capable of generating a file for transferring bulk data between EMS and NE examines whether the current task or occasion is a network discovery process. If the current task is not the discovery process, the process proceeds to block 420 to monitor a switch-over occurrence. If, on the other hand, the current occasion is a discovery process, the process moves to block 404.

At block 404, the process issues an SNMP command to one or more NEs requesting a file generation. At block 406, if additional network circuit exists, the process proceeds to block 408. After obtaining the circuits, a file is built at block 410, wherein the file includes information regarding obtained circuit(s). After storing the file in a storage location at block 412, the process loops back to block 406 to determine whether there is additional circuit(s) that has not been discovered. When the process determines that all of discovery information has been found, the process proceeds to block 414.

At block 414, the NE issues a signal indicating that the file is completed. After issuing a pull command for retrieving the file from EMS at block 416, the process pushes the file from NE to EMS. When the process proceeds to block 418, the file is converted to data formatted in SNMP and proceeds to block 440.

At block 420, the process activates a monitoring application to detect switch-over condition(s) between a primary controller and a backup controller. If switch-over is not detected at block 422, the process loops back to block 420 and the process continues to monitor. If, however, a switch-over has occurred at block 422, the process proceeds to block 426 to receive incoming packet information. Upon obtaining incoming packet data at block 428, a file is built to include incoming packet data at block 430. After storing the file at a local storage location at block 432, the process loops back to block 426 to determine whether there is more incoming packet information over the network or in a local buffer.

When the file is completed, the process proceeds to issue a signal of file completion to EMS at block 434. It should be noted that when a backup controller is up and running, the subsequent incoming packet should be routed quickly. After issuing a command of pull the file at block 436, the process converts information carried by the file to SNMP. At block 440, the process ends after the local storage location is reset.

Figure 5:
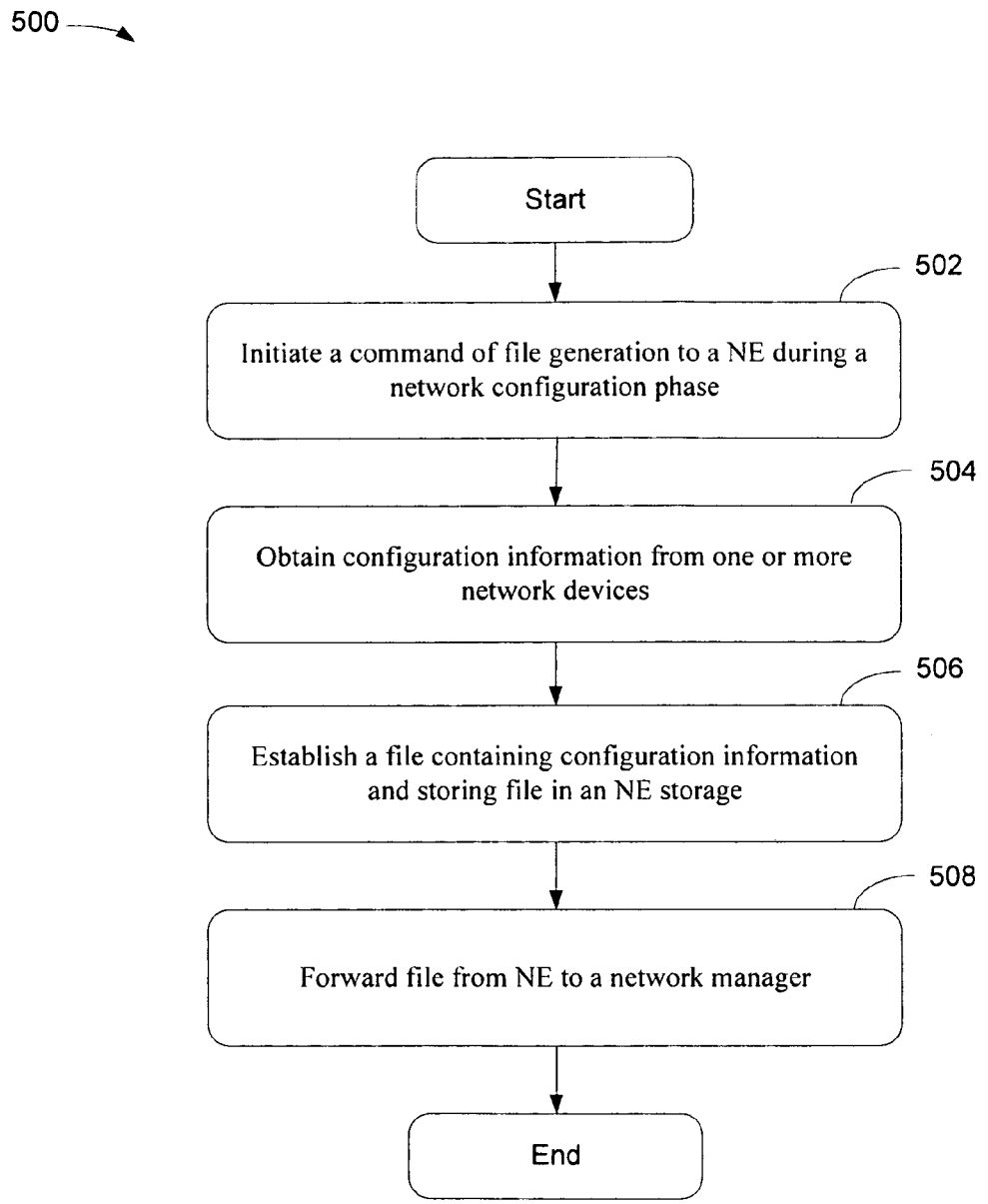
FIG. 5 is a flowchart illustrating an exemplary process of file building in an NE in accordance with one embodiment of the present invention.

FIG. 5 is a flowchart 500 illustrating an exemplary process of file building in an NE in accordance with one embodiment of the present invention. At block 502, a process of information transfer initiates a command of file generation formatted in a first network protocol to an NE during a network configuration phase. While the first network protocol can be SNMP, the network configuration phase is a network discovery process.

At block 504, the process obtains configuration information or discovery information from one or more network devices. In one embodiment, the process collects information relating to network circuits from other routers.

At block 506, the process establishes or creates or generates a file containing the configuration information and subsequently stores the file in a storage location. In one embodiment, the process formats the file and encapsulates the configuration information and/or discovery information including network circuits in the file.

At block 508, the process is capable of forwarding the file formatted in a second network protocol to a network manager. While the network manager can be EMS, the second network protocol can be FTP, SFTP, or TFTP. The process also sends a deletion command from the network manager to delete the file. After identifying the storage located in the NE, the process deletes the file from the storage location in response to the deletion command. The FTP file can facilitate bulk data transfer between an NE and an EMS. In one embodiment, the process converts the information carried by the file from FTP to SNMP after the file is received by the EMS, so that the information being transferred using FTP looks as it was transferred using SNMP to the EMS applications. The process allows EMS to manage or control the storage location situated in the NE.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for information transfer, comprising:
    initiating a command of file generation formatted in a first network protocol to a network element ("NE") during a network configuration phase, wherein the initiating the command of file generation includes forwarding a second command of file generation to a backup NE after detecting an occurrence of switch-over process, wherein the network configuration phase includes the switch-over process;
    obtaining configuration information from one or more network devices;
    establishing a file formatted in a second network protocol containing the configuration information and storing the file in a storage; and
    forwarding the file formatted in the second network protocol from the NE to a network manager, wherein initiating the command of file generation further includes sending a generate file command coded in Simple Network Management Protocol ("SNMP") from an Element Management System ("EMS") to the NE during an initial network discovery, wherein the network configuration phase includes the initial network discovery.

2. The method of claim 1, further comprising sending a command of deletion from the network manager to delete the file from the storage.

3. The method of claim 2, further comprising:
    identifying the storage located in the NE; and
    deleting the file from the storage in response to the command of deletion.

4. The method of claim 3, wherein obtaining configuration information from the one or more network devices further includes collecting information relating to network circuits from the network devices directly or indirectly coupled to the NE.

5. The method of claim 4, wherein establishing a file includes formatting the file with a File Transfer Protocol ("FTP") encapsulating SNMP information relating to multiple network circuits.

6. The method of claim 1, wherein forwarding the file formatted in a second network protocol includes sending the file formatted with one of File Transfer Protocol ("FTP"), Trivial FTP ("TFTP"), and Secure FTP ("SFTP") capable of providing bulk data transfer from a router to an Element Management System ("EMS").

7. The method of claim 6, further comprising converting the file containing the configuration information formatted in FTP to messages formatted in Simple Network Management Protocol ("SNMP") via a predefined conversion module after the file reaches the EMS.

8. The method of claim 1, further comprising removing the file from the storage situated in the NE after the file is forwarded to an element management system ("EMS").

9. A network configuration for file transfer, comprising:
    a network element ("NE") capable of building a file with a File Transfer Protocol ("FTP") in a local NE memory during a network discovery process to initialize a network, wherein the file contains a plurality of network circuits collected from a plurality of network devices;
    an Element Management System ("EMS") coupled with the NE via a connection and configured to receive the file from the NE, wherein the EMS further includes a converter capable of converting the file containing the plurality of network circuits from FTP to messages indicating the plurality of network circuits formatted in Simple Network Management Protocol ("SNMP"), wherein the EMS sends a generate file command coded in SNMP to the NE during the initial network discovery in the network configuration phase, wherein the EMS forwards a second command of file generation to a backup NE after detecting an occurrence of switch-over process during the network configuration phase.

10. The configuration of claim 9, wherein the EMS further includes a SNMP processor capable of processing the file after the file is converted to SNMP.

11. The configuration of claim 10, wherein the EMS further includes a memory control logic capable of managing storage content in the local NE memory.

12. The configuration of claim 11, wherein the EMS includes NE management logic capable of managing a plurality of NEs during initial network discovery.

13. The configuration of claim 12, wherein the EMS further includes switch-over detecting logic capable of pulling a second file containing switch-over information in a buffer from a backup NE.

14. The method of claim 9, wherein detecting the occurrence of switch-over process includes establishing a second file containing a switch-over information stored in a local buffer and storing the second file in a storage located at the backup NE.

15. The method of claim 14, wherein establishing a second file containing a switch-over information stored in a local buffer includes forwarding the second file from the backup NE to an element management system ("EMS") utilizing FTP.

16. The method of claim 14, wherein establishing a second file containing a switch-over information stored in a local buffer includes forwarding the second file from the backup NE to an element management system ("EMS") utilizing SFTP.

17. The method of claim 14, wherein establishing a second file containing a switch-over information includes building the file with a FTP to encapsulate the switch-over information.

* * * * *